US012183567B2

(12) United States Patent
Jenek et al.

(10) Patent No.: US 12,183,567 B2
(45) Date of Patent: Dec. 31, 2024

(54) GAS DISCHARGE LAMP, MORE PARTICULARLY DEUTERIUM LAMP

(71) Applicant: Excelitas Noblelight GmbH, Hanau (DE)

(72) Inventors: Torsten Jenek, Hanau (DE); Gunther Desinger, Hanau (DE)

(73) Assignee: Excelitas Noblelight GmbH, Hanau (DE)

( * ) Notice: Subject to any disclaimer, the term of this patent is extended or adjusted under 35 U.S.C. 154(b) by 32 days.

(21) Appl. No.: 18/250,467

(22) PCT Filed: Sep. 2, 2021

(86) PCT No.: PCT/EP2021/074290
§ 371 (c)(1),
(2) Date: Apr. 25, 2023

(87) PCT Pub. No.: WO2022/089815
PCT Pub. Date: May 5, 2022

(65) Prior Publication Data
US 2023/0402274 A1 Dec. 14, 2023

(30) Foreign Application Priority Data
Oct. 30, 2020 (DE) ..................... 10 2020 128 643.0

(51) Int. Cl.
*H01J 61/06* (2006.01)
*H01J 61/12* (2006.01)

(52) U.S. Cl.
CPC .............. *H01J 61/06* (2013.01); *H01J 61/12* (2013.01)

(58) Field of Classification Search
CPC ................................. H01J 61/06; H01J 61/12
See application file for complete search history.

(56) References Cited

FOREIGN PATENT DOCUMENTS

| | | | | |
|---|---|---|---|---|
| DE | 19628925 | A1 | 1/1998 | |
| DE | 10 2014 105 028 | A1 | 4/2015 | |
| EP | 1437760 | A1 * | 7/2004 | ............. H01J 61/54 |
| JP | H07326324 | A | 12/1995 | |
| JP | H0877965 | A | 3/1996 | |
| JP | H0877969 | A | 3/1996 | |
| JP | H0877979 | A | 3/1996 | |

(Continued)

OTHER PUBLICATIONS

Matsushima, CN101021302, Aug. 2007 (Year: 2007).*
Desinger et al., DE102014105028, Apr. 2015 (Year: 2015).*

*Primary Examiner* — Mary Ellen Bowman
(74) *Attorney, Agent, or Firm* — Wolf, Greenfield & Sacks, P.C.

(57) ABSTRACT

An electrode insert that has: (a) an intermediate wall made of an electrically insulating material, (b) a cathode-side assembly which is mounted on a front side of the intermediate wall and comprises a cathode, a cathode window and a light emission window, (c) an anode-side assembly which is mounted on a rear side of the intermediate wall and comprises an anode and at least one diaphragm, which together with the light emission window defines an optical axis along which a beam generated by discharge is emitted out of the light emission window, wherein at least the anode and the diaphragm are grouped to form a component ensemble, and wherein at least one retaining profile for retaining the component ensemble projects from the rear of the intermediate wall.

22 Claims, 7 Drawing Sheets

(56) References Cited

FOREIGN PATENT DOCUMENTS

Figure 1:
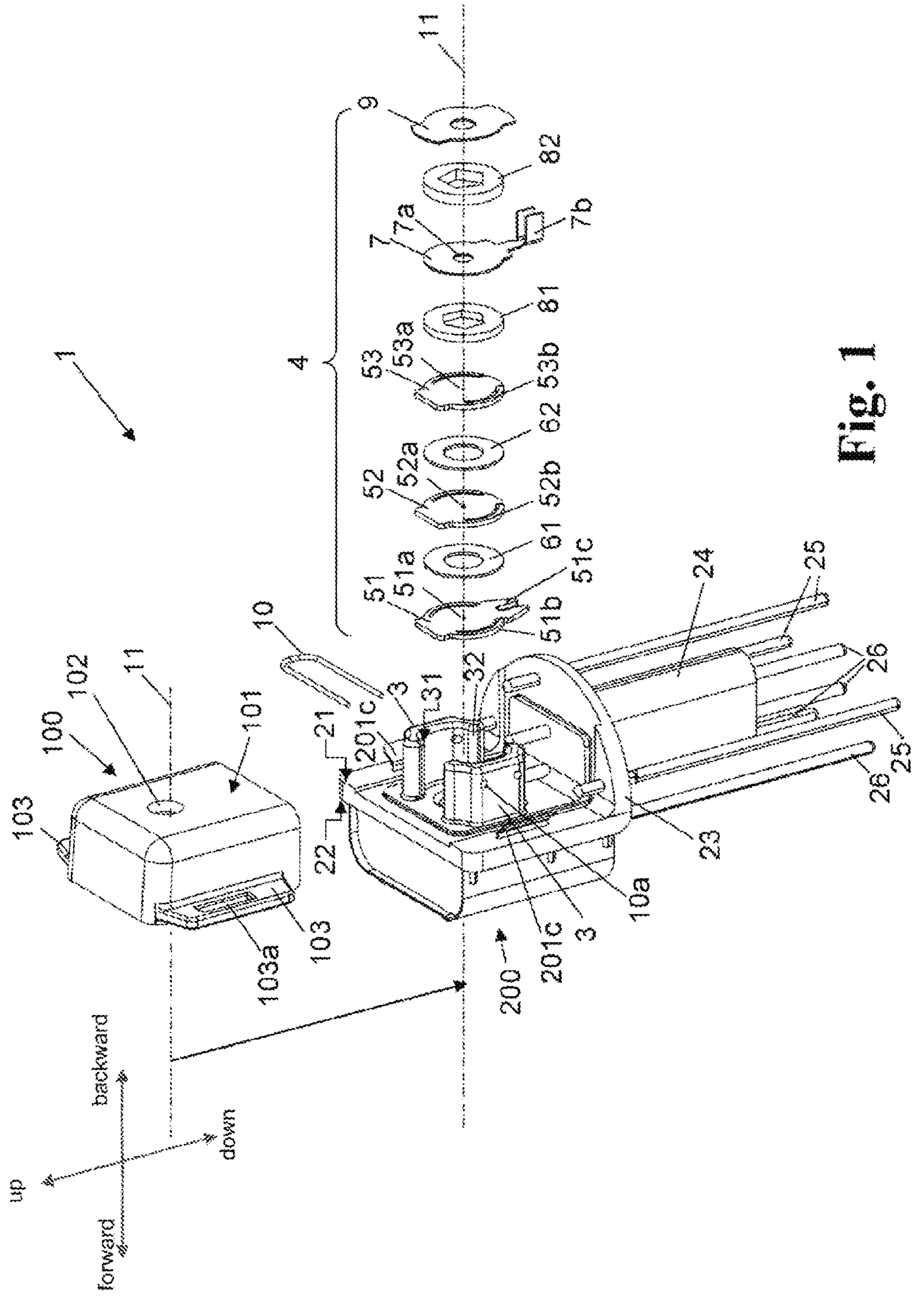

| | | | |
|---|---|---|---|
| JP | H08222185 | A | 8/1996 |
| JP | H08222186 | A | 8/1996 |
| JP | H08236081 | A | 9/1996 |

* cited by examiner

GAS DISCHARGE LAMP, MORE PARTICULARLY DEUTERIUM LAMP

CROSS-REFERENCE TO RELATED APPLICATIONS

This application is a National Stage filing under 35 U.S.C. § 371 of International Application Serial No. PCT/EP2021/074290, filed Sep. 2, 2021, which claims the benefit of priority to German patent application number 102020128643.0, filed Oct. 30, 2020.

TECHNICAL BACKGROUND

The invention relates to a gas discharge lamp, in particular a deuterium lamp, with a high local radiance. Gas discharge lamps of this kind are used for example for spectroscopy applications.

PRIOR ART

In the case of deuterium lamps, the current designs on the market for generating high radiance levels are based on an elongated, channel-like diaphragm. However, this embodiment has the disadvantage that the lamp is difficult to ignite in the case of a single long channel. The arc voltage of the lamp is also significantly increased by the long diaphragm channel as compared to a standard deuterium lamp with a single, flat diaphragm, this having a negative effect on the service life.

In order in particular to compensate for the effect of more difficult ignition, additional electrodes must be introduced into the lamp, which increase complexity in the design and in the electrical control of the lamp.

From DE 196 28 925 A1 a UV discharge lamp is known, comprising a lamp bulb made of quartz glass and an electrode housing arranged therein, which contains an anode and a cathode. Between the two electrodes there is a diaphragm arrangement composed of a plurality of optical diaphragms made of high-melting material. The diaphragm opening serves to constrict the arc discharge generated between the electrodes. The multiple-diaphragm arrangements lead to a strong increase in or multiplication of the radiance by the formation of several plasma spheres with relatively little outlay. In a preferred embodiment, three diaphragms are provided, each of which is individually connected to the voltage supply of the electrodes via controllable switches, wherein the diaphragms are ignited one after the other. In this case, the diaphragms perform an auxiliary anode function which enables a stepwise ignition of the deuterium lamp, which results in increased ignition reliability.

EP 1 437 760 A1 describes a deuterium lamp with a gas-tight lamp bulb made of glass with a lamp foot (base) and cylindrical side wall, one part of which serves as a light-emitting window. A light-emitting assembly (electrode insert), which has an electrically conductive housing made of nickel, is accommodated in the lamp bulb. A shaft, which is connected to the lamp foot, is welded to the distal housing end. The light-emitting assembly comprises a disk-shaped anode, and a plurality of diaphragms which delimit the discharge path. The anode is welded to the distal end of an upright pin, which in turn is fastened to the lamp foot. The diaphragms consist of molybdenum or tungsten and have a diaphragm opening with a diameter of approximately 0.5 to 1 mm. They are each fastened to the housing via a metal support plate. In addition, a metallic front cover with a light passage opening in the direction of the optical axis is fastened to the housing. The cathode is accommodated a cathode chamber of the housing laterally in relation to the optical axis. This prevents material sputtered off or vaporized by the cathode from being deposited on the light-emitting window.

DE 10 2014 105 028 A1 discloses a deuterium lamp with a gas-filled lamp bulb which surrounds an electrode insert. The electrode insert comprises a diaphragm between anode and cathode and a housing partition wall made of ceramic. The cathode, a cathode window and a light emission window are arranged on one side of the housing partition wall, and the anode is arranged on the other side.

Technical Object

As a result of the multiple diaphragms, known gas discharge lamps have a comparatively high radiance. However, their electrode inserts are composed of a plurality of individual components. During assembly and adjustment of these components, distances and orientation in relation to one another and in relation to the optical axis must be maintained exactly and reproducibly, which is particularly problematic when the components have to be positioned by means of retaining rods and welded connections. Especially in the case of strict demands on the dimensional accuracy and precision of the gas discharge lamps, the manufacturing effort in terms of duration and costs as well as the reject rate is high.

It is thus the object of the invention to provide a gas discharge lamp having a high radiance, which is characterized by a simple structural design and at the same time good ignition and low arc voltage.

GENERAL DESCRIPTION OF THE INVENTION

This object is achieved by a gas discharge lamp, in particular a deuterium lamp, a gas-filled lamp bulb which surrounds an electrode insert with the features of claim 1. The electrode insert comprises:

(a) a partition wall made of an electrically insulating material, (b) a cathode-side assembly mounted on a front side of the partition wall and comprising a cathode and a light emission window, (c) an anode-side assembly mounted on a rear side of the partition wall, comprising an anode and at least one diaphragm, which defines an optical axis with the light emission window along which optical axis a radiation generated by discharge is emitted from the light emission window, wherein at least the anode and the at least one diaphragm are combined to form a component ensemble, and wherein at least one retaining profile for retaining the component ensemble projects from the rear side of the partition wall.

The electrode insert is the component group which generates the light of the arc discharge between anode and cathode and emits it through the light emission window onto the lamp bulb of the discharge lamp. The electrode insert comprises a partition wall made of an electrically insulating material, such as, for example, ceramic and in particular aluminum oxide ceramic. On its one wall side (referred to here as "front side"), the partition wall carries a cathode-side assembly and on the other wall side (here referred to as "rear side") carries an anode-side assembly.

The anode-side assembly comprises the anode and at least one diaphragm, preferably at least two diaphragms. Optionally, the diaphragms are spaced apart from one another and electrically insulated from one another, so that each of the diaphragm openings leads to a constriction of the arc discharge and causes the formation of a plasma ball and a "halo" in front of and behind the diaphragm opening. This creates additional radiance.

At least the diaphragm and the anode are combined to form a common component ensemble, preferably a stacked component ensemble, which is also referred to below as a "component stack".

A retaining profile for retaining the component ensemble projects from the rear side of the partition wall. The retaining profile is, for example, at a right angle to the partition wall rear side. It is preferably an integral component of the partition wall or is connected directly or indirectly to the partition wall via an intermediate element. The retaining profile consists of a single retaining element, for example a cylindrical or conical profile element, or is composed of a plurality of retaining elements, for example a plurality of cylindrical and/or conical profile elements. These are distributed, for example, over the rear side of the partition wall in such a way that they define a receiving space around the optical axis that is laterally more or less closed, which serves to accommodate the component ensemble. This receiving space has, for example, a cylindrical internal geometry, but it can also widen conically from the rear side at least over a part of its extension length. The walls of the profile elements facing the receiving space can be straight in plan view or they can be curved, preferably they have, in plan view, a U-shaped, V-shaped, C-shaped or horseshoe-shaped cross-section, for example. In a particularly preferred embodiment, the retaining profile comprises at least two tube-shell-shaped profile parts which are arranged around the optical axis with their open sides opposite one another.

The component ensemble is accommodated in the retaining profile or on the retaining profile. Apart from the at least one diaphragm and the anode, the component ensemble may comprise other components, such as at least one further diaphragm and spacer elements or insulating elements. All components of the ensemble can be connected to one another in a force-fitting, friction-fitting or form-fitting manner, so that the component ensemble as a whole is retained in or on the retaining profile. For this reason individual components of the ensemble, in particular of the stack, need not be retained separately. This already facilitates the installation of the electrode insert.

In the case of a stacked component ensemble, these components generally have a disk or ring shape and, by being placed above or next to each other, form an essentially cylindrical component stack with plane-parallel contact surfaces. Pressing the contact surfaces against one another creates a friction-fitting or force-fitting connection. This arrangement of the components simplifies assembly and increases the accuracy of positioning the components relative to one another.

When the at least one diaphragm is designed as an electrically active component with a separately adjustable electrical potential, a particularly simple electrical contacting is facilitated if at least one of the diaphragms, preferably the foremost diaphragm, has a contact for an electrical connection pin.

The contact is preferably designed as a socket for receiving the connection pin, for example with elastic deformable walls which resiliently encompass and fasten the connection pin.

In the case of a component ensemble designed as a component stack, as regards the interplay of the component stack and the retaining profile, an embodiment is preferred in which the component stack has a stack height and a stack circumference and the retaining profile at least partially encloses the stack circumference over the stack height.

The retaining profile projecting from the partition wall rear side consists of one profile element or a plurality of profile elements distributed around the optical axis which define a space around the optical axis which serves to receive the component stack. The space is closed laterally or is more or less open laterally. The height of this space is determined by the length of the profile elements, i.e. by the distance of the free end of the shortest retaining profile from the partition wall rear side. This height is greater than the stack height, so that the component stack can be completely accommodated in the retaining profile receptacle.

It proves advantageous here if the component stack comprises a spring element which is designed to press the component stack against the partition wall.

The spring element exerts a compressive force in the direction of a component-stack center axis. As a result of the pressure of the spring element, all components of the stack which are located between the partition wall rear side and the spring element are pressed against one another, and thus fixed both in their axial position and in their radial position by friction- or force-fitting connection.

Installation by means of a spring element, for example a spring washer or a spring clip, moreover has the advantage that it can be implemented quickly and easily.

The spring element thus contributes to the simplification of assembly and to the reproducibility of component positioning. It is usually—but not necessarily—the outermost component of the component stack. It rests against an abutment which is located outside the component stack, for example on a retaining bracket.

In a preferred embodiment of the gas discharge lamp, the component ensemble comprises insulating elements and at least one spacing compensation element.

The insulating elements are used, on the one hand, for the electrical insulation of the diaphragms from one another or from other components which are at a different electric potential. On the other hand, they enable—due to their thickness alone—an exact adjustment of the desired distance between adjacent diaphragms.

The spacing compensation element serves to set a pre-specified height of the component stack.

In the case of the component ensemble explained above, at least one disk-shaped diaphragm, preferably two or more disk-shaped diaphragms and the anode and also other components are combined to form a component stack. This component stack, regardless of how it is retained, the arrangement of the components of the ensemble with respect to one another and any advantageous embodiments of individual components, represents an invention which can be used in a gas discharge lamp.

In the case of a component ensemble that is at least partially enclosed laterally within a receptacle of the retaining profile, there may be a certain mechanical play in the retaining profile receptacle. However, in particular, the diaphragm opening or the diaphragm openings should lie as exactly as possible on the optical axis. In order to improve the radial positioning of the individual diaphragm or the axial alignment of the diaphragms in the component stack, at least one of the diaphragms has—preferably all of the diaphragms have—spring elements which are supported, for example, on the retaining profile in a preferred embodiment.

The spring elements are ideally integral components of the diaphragm. They can be produced, for example, by cutting more or less peripherally into the diaphragm material on two opposite sides of the diaphragm starting from the diaphragm edge, as a result of which an elongate bracket is formed at the diaphragm edge, which remains connected to the remaining diaphragm material and which is elastically deformable within the bounds of the kerf width.

Optionally, the at least one diaphragm is designed as a diaphragm disk, wherein the integral spring elements are designed by flexible brackets created by peripheral disk-edge incisions on opposite sides of the diaphragm disk.

Optionally, abutments on which the spring elements are supported are assigned in the retaining profile receptacle. The spring force generated as a result of the elastic deformation is absorbed by another contact point which is located on the opposite side of the receptacle as seen in the direction of force. Overall, the two spring elements for the diaphragm result in four defined contact points within the retaining profile receptacle and thus a reproducible and exact four-point mounting of the diaphragm in the receptacle. This contributes to a simple assembly and precise adjustment of the diaphragm openings in the optical axis.

In embodiments of the component ensembles with a plurality of disk-shaped diaphragms and when using the diaphragms with other disk-shaped components in a component stack, all diaphragms are preferably equipped with such spring elements. As a result, the diaphragm openings of the diaphragms arranged axially spaced apart from one another and each mounted in the receptacle by means of a four-point mounting are aligned on the optical axis\. By pressing the flat sides of the disk-shaped components of the stack, a joining connection of the components of the stack is also achieved solely by frictional connection (=non-positive connection) and thus an exact positioning of the component stack overall.

Regardless of the manner of its arrangement in a component stack or other possible advantageous embodiments of the diaphragm, the above-explained embodiment of the diaphragm with integral spring elements represents an invention which can be used in a gas discharge lamp.

In a further preferred embodiment of the gas discharge lamp, a mounting plate is arranged on the rear side of the partition wall, which mounting plate is provided with through-holes through which connection elements for establishing an electrical connection to the cathode-side assembly and to the anode-side assembly extend.

The partition wall and the mounting plate are preferably designed as one piece. The mounting plate projects, for example, at a right angle from the partition wall rear side.

Electrical connections to the cathode-side assembly and to the anode-side assembly are guided through the through-holes of the mounting plate. This allows electrical potentials at the anode, cathode and other components, such as a diaphragm, to be adjusted by connecting to a voltage source outside the lamp bulb.

In addition, retaining rods which serve for fastening the electrode insert in the lamp bulb can engage in the mounting plate.

In addition, the mounting plate can be connected to a hollow mounting base which in the installed state extends in the direction of a lamp foot of the gas discharge lamp.

The mounting base preferably consists of ceramic and can serve for additional mounting of the electrode insert on the lamp foot of the lamp bulb. Since the mounting base is hollow on the inside, electrical connection pins or lines and/or retaining rods can also be guided through electrically insulated from one another.

The partition wall, the mounting plate and the mounting base are preferably designed as one piece. This avoids component gaps which can lead to electrical flashovers during ignition of the discharge.

In a particularly preferred embodiment of the gas discharge lamp, the anode-side assembly comprises an anode housing which surrounds the retaining profile and a component stack retained thereon, and the cathode-side assembly comprises a cathode housing for receiving the cathode.

The additional enclosure of the assemblies shields the discharge arc from the environment, prevents parasitic secondary discharges and thus supports the routing of the discharge arc through the diaphragm opening In particular with regard to a simple and accurate assembly of the gas discharge lamp, it has proven to be particularly advantageous if the cathode housing is composed of a plurality of molded parts which are connected to one another by means of a plug-in connection, in particular an interlocking connection consisting of insertion tab and slot.

If the cathode housing has bendable insertion tabs which correspond to longitudinal slots in the partition wall this will also contribute to the simple and dimensionally accurate assembly of the gas discharge lamp.

The assembly process for fastening the cathode housing to the partition wall comprises inserting the insertion tabs through the longitudinal slots and bending over the insertion tabs.

The anode housing is preferably provided with longitudinal slots which, in the installed state, extend coaxially with the longitudinal slots of the partition wall. As a result, during the assembly of the cathode housing the anode housing can also be mounted on the partition wall in one operation by inserting the plug-in tabs not only through the longitudinal slots of the partition wall but also through the longitudinal slots of the anode housing and bending them over. In this embodiment of the gas discharge lamp, three components, namely the partition wall, the anode housing and the cathode housing, are connected to one another simultaneously and with dimensionally accurate positioning by means of the interlocking connection of insert tab and slot.

In a particularly preferred embodiment of the gas discharge lamp, this comprises a glass foot plate, mounted in the lamp bulb, on which a plurality of retaining rods and a plurality of electrical connection pins are mounted, wherein the foot plate, the retaining rods and the connection pins form a prefabricated assembly which are electrically and mechanically connected to the electrode insert. The mounting plate is preferably locked on the retaining rods by widening the retaining rod regions directly above and/or below the mounting plate. Additionally or alternatively, the locking is effected above the mounting plate by slitting the upper retaining rod end and bending over the slit ends.

DETAILED DESCRIPTION OF THE INVENTION

Figure 2:
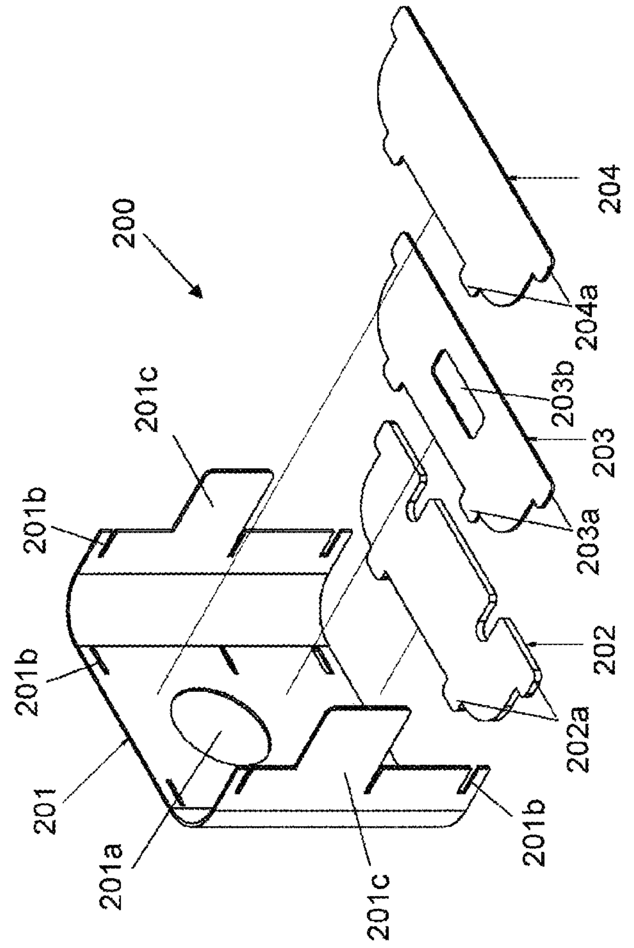
Figure 3:
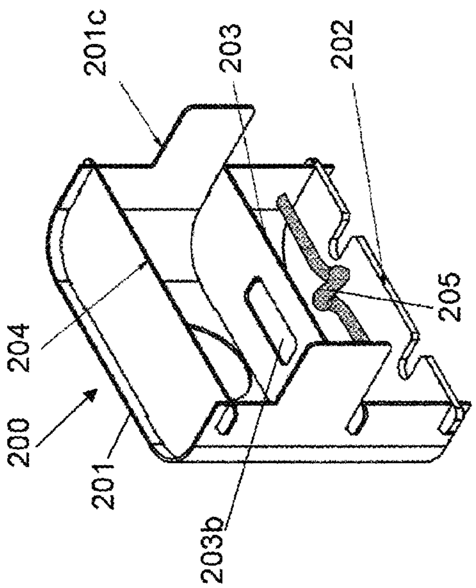
Figure 4:
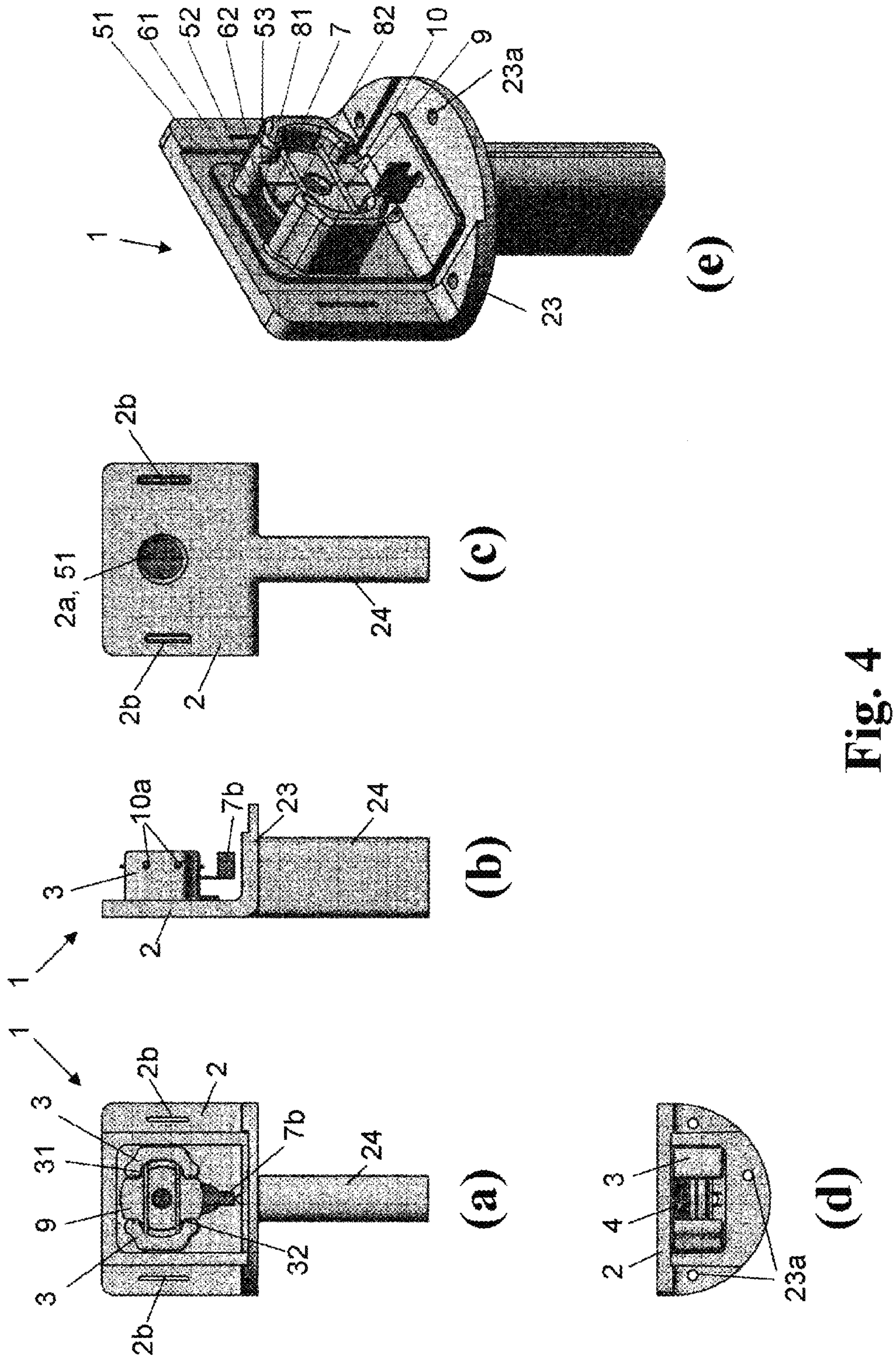
Figure 5:
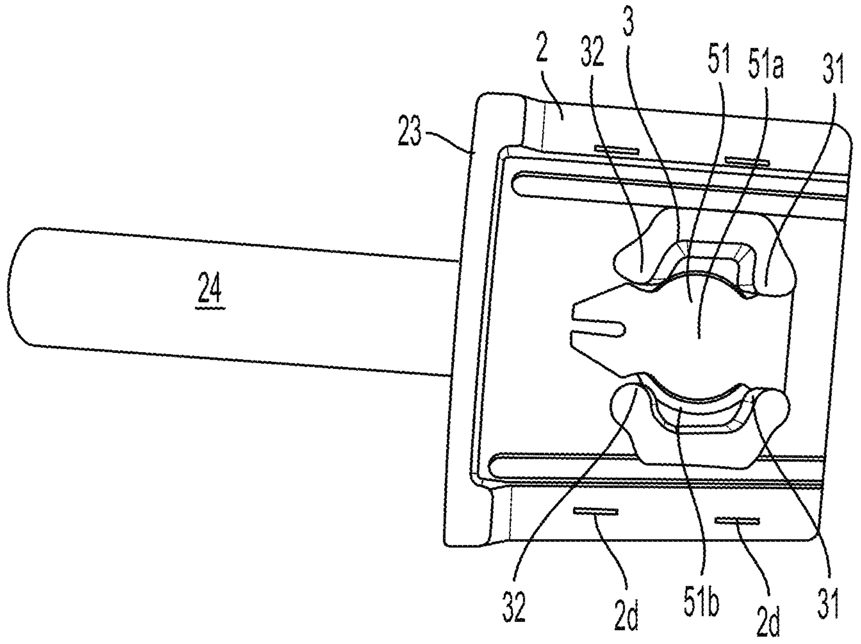
Figure 6:
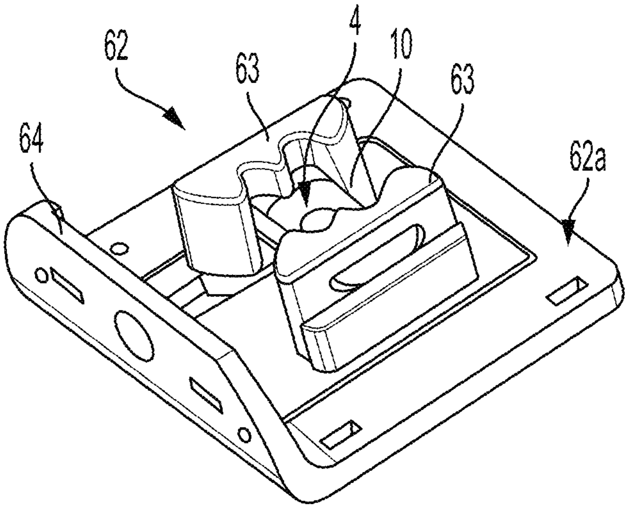
Figure 7:
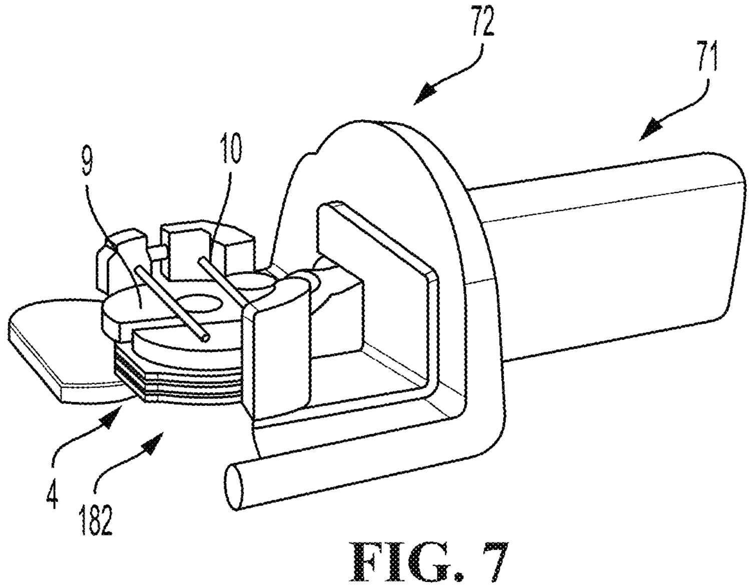
Figure 8A:
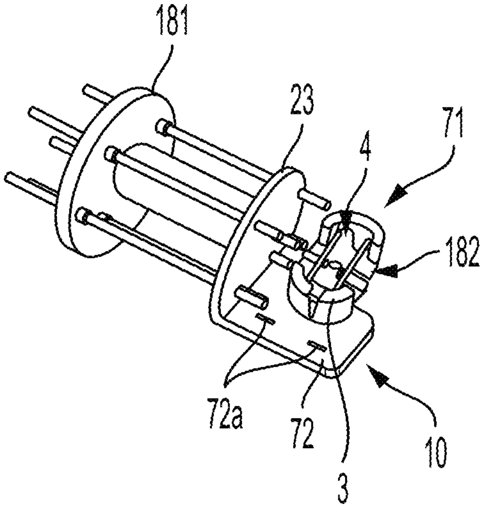
Figure 8B:
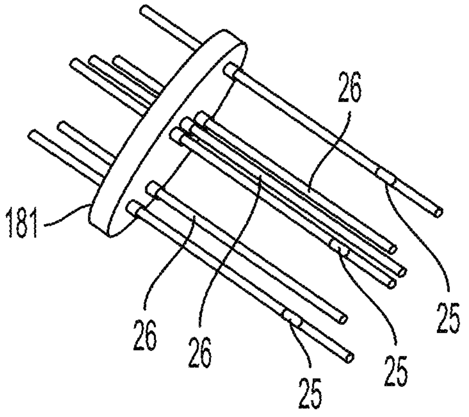
Figure 8C:
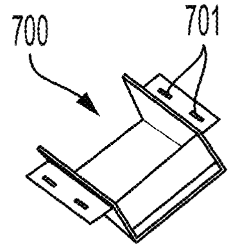
Figure 8D:
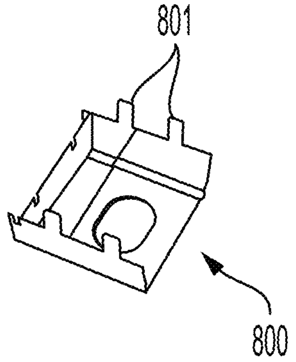
Figure 9A:
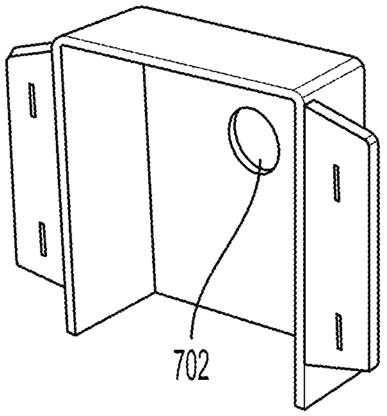
Figure 9B:
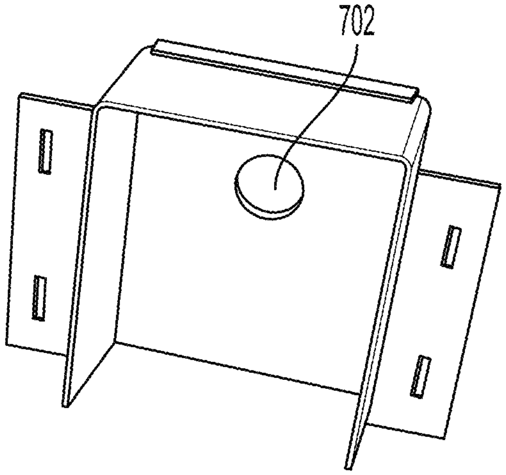
Figure 10:
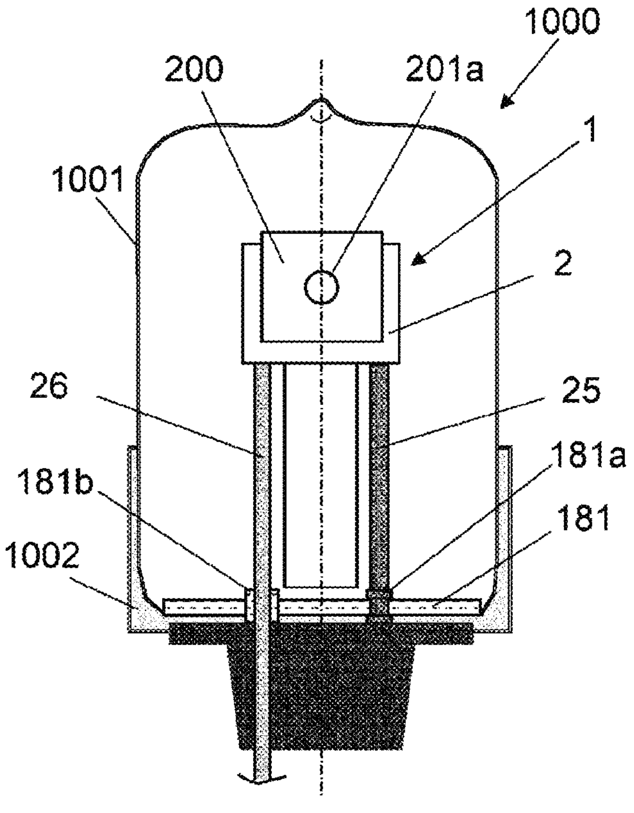
Figure 11:
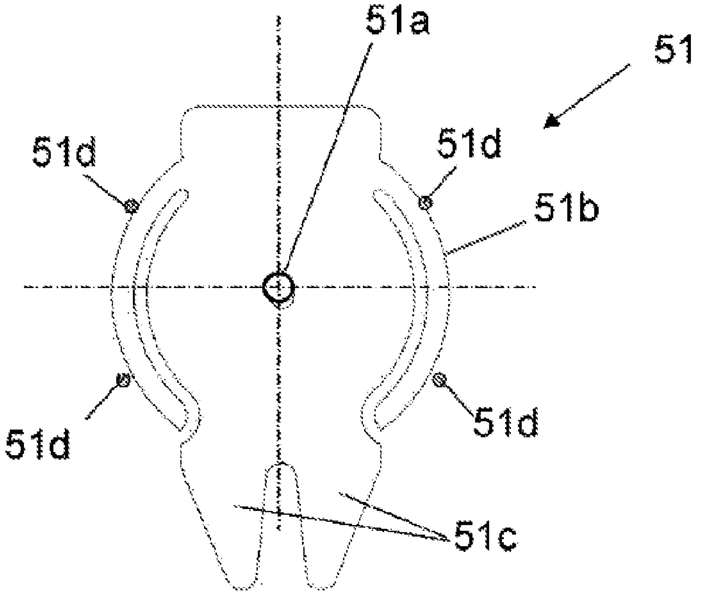

The invention is explained in more detail below with reference to an exemplary embodiment and a patent drawing. The following are shown in detail:

FIG. 1 an embodiment of an electrode insert for a deuterium lamp, based on an exploded view, FIG. 2 an embodiment of a cathode-side housing for the electrode insert of FIG. 1, in an exploded view, FIG. 3 the cathode-side housing of FIG. 2 in an assembly drawing FIG. 4 a plurality of views of the electrode insert of FIG. 1, FIG. 5 a photograph of a ceramic partition wall for an electrode insert in a plan view of the retaining profile with inserted foremost diaphragm, FIG. 6 an alternative embodiment of a partition wall for an electrode insert in a three-dimensional representation, FIG. 7 a photograph of an electrode insert similar to that of FIG. 1 with a ceramic partition wall with a break-out of the retaining profile in order to demonstrate the component stack located therein FIG. 8 a photograph of the electrode insert of FIG. 7 in assembly with retaining rods and electrical connection pins and a glass plate (as foot of a deuterium lamp) and also other individual parts of the electrode insert, FIG. 9 a photograph with two variants of a housing for the anode-side assembly, FIG. 10 a schematic sketch of a gas discharge lamp according to the invention in a view of the rear side, and FIG. 11 a disk-shaped diaphragm with lateral spring elements and a receiving socket for an electrical connection pin in a plan view.

The directional cross drawn above the exploded view of the electrode insert according to FIG. 1 serves to illustrate positional or orientational information used in the following description of the electrode insert.

The central component of the electrode insert 1 is a ceramic partition wall 2 serving as a carrier assembly for a plurality of components. From the rear side 21 of the ceramic partition wall 2, two structurally identical, substantially cylindrical, and in plan view C-shaped retainers 3 project vertically, which are face one another with their open C-sides and which are also referred to below as "C-towers" 3. The C-towers 3 define an essentially cylindrical intermediate space extending coaxially with the optical axis 11. This serves to receive and retain a stack of a plurality of components arranged one after the other, which overall is assigned the reference number 4, and which is also referred to below as a "diaphragm stack". In the exemplary embodiment, the substantially cylindrical intermediate space has an almost circular cross-section with a minimum inner diameter of 8 mm.

A plurality of diaphragms are combined in the diaphragm stack 4; in the exemplary embodiment, there are three diaphragms 51, 52, 53 made of molybdenum, which are separated and electrically insulated from one another by spacer rings 61, 62 made of ceramic. Adjoining to the rear is an anode 7, bounded on both sides by ceramic disks 81, 82, with central hole 7*a* and connection tabs 7*b*. The diaphragm stack 4 is outwardly completed by a spring washer 9. For fastening the diaphragm stack 4 between the C-towers 3, a retaining bracket 10 made of molybdenum is used, which is guided through holes 10*a* in the C-towers 3. It serves as an abutment for the spring washer 9, which by its spring force presses the diaphragm stack 4 forwards in the direction of the ceramic partition wall rear side 21. The spacer rings 61, 62 and the ceramic disks 81, 82 are circular and have a diameter of 7.9 mm. Any regions of the other components 51, 52, 53, 7, 9 projecting beyond the circular shape extend through a free gap between the two C-towers 3, thus likewise fitting into the intermediate space; they are used to support the alignment of the components during assembly and contribute to protecting against rotation.

The diaphragms 51, 52, 53 each have a diaphragm hole 51*a*, 52*a*, 53*a* with a diameter of 0.3 mm, wherein the center points of the diaphragm holes 51*a*, 52*a*, 53*a* lie on the optical axis 11. The foremost diaphragm 51 is also provided with contact legs 51*c* for receiving an electrical connection pin (26), via which an additional auxiliary ignition pulse can be applied to the foremost diaphragm 51. Otherwise, it is the task of the diaphragms 51, 52, 53 to constrict the plasma of the deuterium lamp and thus to produce a plasma with high local radiance, said plasma being precisely localized.

The diaphragms 51, 52, 53 each have two elastically resilient, integral brackets, which are produced by a lateral peripheral incision in the diaphragm edge, and which are referred to below as "spring legs" 51*b*, 52*b*, 53*b*. In the installed state, the spring legs 51*b*, 52*b*, 53*b* exert a force directed in the direction perpendicular to the optical axis 11 onto the diaphragms 51, 52, 53 and press them against two contact beads 31 in the upper half of the C-towers 3. The two spring legs 51*b*, 52*b*, 53*b* support themselves against two other contact beads 32 in the lower half of the C-towers 3, so that all diaphragms 51, 52, 53 are retained between the C-towers 3 with a total of four contact points (four-point mounting). The two contact beads 31 in the upper half of the C-towers 3 lie on the same radius starting from the optical axis 10. This ensures a centering of all diaphragms 51, 52, 53 of the diaphragm stack 4 on the optical axis 11 of the deuterium lamp without further aids, which is important for an optimal radiance of the deuterium lamp.

The diaphragms 51, 52, 53 of the diaphragm stack 4 aligned on the optical axis 11 of the deuterium lamp form a channel on the projection of the optical axis 11, the diameter of which channel corresponds to that of the individual diaphragm holes 51*a*, 52*a*, 53*a*. The disadvantage of a correspondingly long individual channel in relation to ignition behavior is avoided by the separation of the diaphragms 51, 52, 53 by means of the ceramic spacer rings 61, 62.

The diaphragms have thicknesses in the range of 0.1 to 1 mm; in the exemplary embodiment it is 0.5 mm. The ceramic spacer rings 61, 62 determine the diaphragm spacing and have thicknesses in the range of 0.1 to 1 mm; in the exemplary embodiment, it is 0.25 mm. The front ceramic disk 81 is arranged behind the last diaphragm 53 and has a thickness in the range of 0.1 to 1 mm, in the exemplary embodiment it is 0.8 mm. The thickness of the rear ceramic disk 82 is designed such that a total length of 4 mm results for the diaphragm stack 4 (without spring washer 9 and retaining bracket 10). An electrical connection pin 26 (anode pin) is welded to the anode pin of the lamp foot at the connection tabs 7*b* of the anode 7.

During operation, the deuterium lamp heats up to an operating temperature above room temperature. The thickness of the spring washer 9 at 0.2 mm and its bending radius at 6 mm are designed such that, on the one hand, the components in the component stack 4 cannot slip and that, on the other hand, the thermal expansion of the component stack 4 can be compensated during operation of the deuterium lamp. Despite the absence of play, the spring-loaded mounting of the diaphragms 51, 52, 53 also enables a compensation for the different thermal expansions of ceramic (of the spacer disks and insulating disks) and molybdenum (of the diaphragms). The choice of molybdenum as the diaphragm material ensures a spring property over the entire temperature range.

Thickness and number of diaphragms and the diaphragm opening diameter influence the ignition behavior, the arc voltage and the radiance of the deuterium lamp. With increasing number and thickness of the diaphragms and decreasing diameter of the diaphragm opening, ignition of the lamp becomes more difficult and the arc voltage rises. The total length of the diaphragm channel is predetermined by the diaphragms 51, 52, 53 including the spacer disks 61, 62. For a defined total length of the diaphragm channel, it has proven to be more advantageous to use a plurality of thin diaphragms than a few thick diaphragms. In this case, ignition takes place more reliably and the arc voltage is lower. This was demonstrated in tests. The hole diameter of the diaphragms is usually less than 0.5 mm (in the exemplary embodiment it is 0.3 mm); a diaphragm thickness of 0.5 mm, a diaphragm spacing of 0.25 mm (thickness of the spacer disks 61, 62) and a diaphragm number of 3 result in a total channel length of 2.00 mm.

For plasma guidance, both the diaphragm stack 4 on the rear side 21 and the cathode on the front side 22 of the ceramic partition wall 2 are each enclosed by a housing 100, 200.

Insofar as the same reference numbers are used in FIGS. 2 to 11 and in the description of the figures, as in FIG. 1, they denote the same components or equivalent components of the gas discharge lamp.

FIG. 2 shows the front assembly 200 which is mounted on the front side of the ceramic partition wall 2 and surrounds the cathode chamber. This is composed of a metal front 201 with a light emission window 201*a* which corresponds to an opening (reference number 2*a* in FIG. 4(*c*)) of the ceramic partition wall 3, a metal intermediate plate 203 with cathode window 203*b*, a metallic top plate 204 and a ceramic bottom plate 202. For assembly, the metal intermediate plate 203, the top plate 204 and the ceramic bottom plate 202 are inserted with tabs (202*a*, 203*a*, 204*a*) into corresponding slots 201*b* in the metal front 201. FIG. 3 shows the metal front assembly 200 when assembled. In addition, the position of the wound cathode 205 is indicated.

The metal front 201 is curved in a U-shape and has two rearwardly pointing tabs 201*c*, by means of which it is fastened to the front side 22 of the ceramic partition wall 2. Here, the two tabs 201*c* are inserted through two corresponding slots (reference numeral 2*b* in FIG. 4(*a*)) in the ceramic partition wall 2 and then bent over. This achieves a play-free mounting of the metal front assembly 200 on the partition wall 2. Alternative technologies such as riveting or welding are more complex. Welding also has the disadvantage that the heating of the materials leaves oxidation traces which can have a disadvantageous effect on the operation of the deuterium lamp.

On the rear side 21 of the partition wall 2, the diaphragm stack 4 together with the anode 7 is enclosed by an anode housing 100, the rear wall 101 of which has a hole 102 on the optical axis 11 and enables a combined use of the deuterium lamp according to the invention with an incandescent lamp. In this case, the light of the incandescent lamp radiates through the deuterium lamp (shine-through operation) in order to produce a combined UV/VIS spectrum. The anode housing 100 reduces secondary discharges, i.e. discharges which do not lead through the channel of the diaphragm stack 4. The anode housing 100 can be made of metal or ceramic. Preferably, it consists of metal in order to keep the weight and the costs of the deuterium lamp low.

For fastening to the partition wall 2, the anode housing 100 is provided with two laterally protruding wings 103, in each of which a longitudinal slot 103*a* extends from top to bottom. For fastening, the tabs 201*c* of the front assembly 200 are also inserted through these longitudinal slots 103*a*.

The design principle of inserting tabs through slots and then fastening them by bending enables a play-free mounting of the entire housing structure in a simple and cost-effective manner.

Integral components of the ceramic partition wall 2 are a mounting plate 23 pointing at right angles to the rear and a mounting base 24. For mounting the ceramic partition wall 2 on a foot plate 181 (shown in FIG. 8), three retaining pins 25 made of metal are provided, which extend along the mounting base 24 and whose ends extend on one side through through-holes (reference numeral 23*a* in FIG. 4 (*d*)) in the mounting plate 23 and on the other side through through-holes in the foot plate 181. Via the three retaining pins 25, the ceramic partition wall 2 is thus mounted on the foot plate 181 of the deuterium lamp at three support points.

For fastening, the free ends of the retaining pins 25 are crimped, welded, pinched or bent over. In particular by bending over above the mounting plate 23, a play-free mounting of the ceramic partition wall 2 against the lower support points on the foot plate 181 can be realized. This is important for the exact localization of the plasma in lamp operation.

In an alternative embodiment, the retaining pins 25 are pinched on the underside of the mounting plate 23 in order to produce support points here which define the height of the ceramic partition wall 3 above the foot plate 181. The support points are located on the retaining pins 25 directly below the mounting plate 23. They can either be crimped as sleeves onto the retaining pins or the retaining pins 25 themselves are pinched so that material projects beyond the actual diameter of the retaining pins 25, which serves as a bearing surface.

In a further alternative embodiment, the retaining pins 25 are not bent over on one side above the mounting plate 23, but are slit in the center and the slitted ends are bent symmetrically in two directions.

Further through-holes of the mounting plate 23 serve for the electrical contacting of the electrodes (anode, auxiliary anode and cathode (with two terminals)). For this purpose, electrical connection pins 26 extend on the one hand through the through-holes of the mounting plate 23 to the corresponding electrodes, and on the other hand right through through-holes of the foot plate to electrical connection elements of the deuterium lamp.

Further details can be seen from the views of the electrode insert 1 in FIG. 4, such as the slots 2*b* in the ceramic partition wall 2 in the front view of FIG. 4(*a*) and in the rear view of FIG. 4(*c*). As well as the through-holes 23*a* of the mounting plate in the plan view of FIG. 4(*d*). FIG. 4(*b*) shows a side view of the electrode insert 1 and FIG. 4(*e*) an assembly.

From the plan view of the retaining profile 3 with the foremost diaphragm 51 inserted therein according to FIG. 5 the two lateral spring legs 51*b* and the kerf 51*d* for their production are clearly visible. To ensure the four-point mounting of the diaphragm 51, the spring legs 51*b* rest against the two lower contact points 32 of the C-towers 3 and press the diaphragm 51 against the two upper contact points 31. The photograph shows a variant of a ceramic intermediate plate 2, which for the assembly of anode housing and cathode housing is provided laterally with double slots 2*d* for the insertion of corresponding connection tabs.

FIG. 6 shows an embodiment of a partition wall 62 for an electrode insert with an alternative retaining profile and the diaphragm stack 4 mounted therein. The alternative retaining profile is formed from two structurally identical cylindrical profiles 63 which project perpendicularly from the rear side 62*a* of the partition wall 62. In cross-section, the profiles 63 are essentially rectangular, each having an indented longitudinal side, which face one another and define the receiving space for the diaphragm stack 4.

The photograph of FIG. 7 shows an electrode insert 71 with a ceramic partition wall 72 with a cutout 182 in the region of one of the retaining profiles 3. The cutout 182 makes the diaphragm stack 4 and its fastening by means of the spring washer 9 and the retaining bracket 10 visible. The construction of the electrode insert 71 essentially corresponds to that of the electrode insert 1 of FIG. 1.

The photograph of FIG. 8 shows once (a) the foot plate 181 in the connection to the mounting plate 23 of the electrode insert 71 of FIG. 7 (with the additional cutout 182). And it shows another time (b) the foot plate 181 in connection with only the retaining rods 25 and the connection pins 26. The foot plate 181 can consist of soft glass or quartz glass. In the case of soft glass, the connection pins 26 preferably consist of an iron-nickel-cobalt alloys with a coefficient of thermal expansion matched to the coefficient of thermal expansion of soft glass, and in the case of quartz glass, the connection pins 26 preferably consist of molybdenum. The ensemble of the components foot plate 181, retaining rods 25 and connection pins 26 is preferably a prefabricated assembly which, during the further processing to form the gas discharge lamp, only has to be electrically and mechanically connected to the electrode insert 71.

The part (c) is a housing 700 for the anode-side assembly, and the part (d) is a housing 800 for the cathode-side assembly. For the purpose of mounting on the ceramic partition wall 72, the housing 700 is provided with a double slot 701, and the housing 800 is provided with a double tab 801. For this purpose, the ceramic partition wall 72 likewise has a suitable double slot 72*a*.

FIG. 9 shows a photograph with two alternative embodiments of the housing for the anode-side assembly. The housing (a) consists of $Al_2O_3$ ceramic. The housing (b) consists of nickel. The rear wall in each case has a hole 702 which enables a combined use of the deuterium lamp with an incandescent lamp.

The sketch of FIG. 10 schematically shows a gas discharge lamp 1000 according to the invention in a rear view. The gas discharge lamp 1000 comprises a lamp bulb 1001 made of quartz glass mounted in a ceramic base 1002 and which contains a filler gas in the form of pure deuterium and encloses an electrode insert 1, as explained with reference to FIG. 1. The electrode insert 1 comprises a ceramic partition wall 2, on which a plurality of components are mounted, including a cathode housing 200 with the light emission window 201*a*. The lamp bulb 1002 is equipped with a flat foot plate 181. The mounting of a retaining rod 25 on the foot plate 181 by means of a crimp connection 181*a* made on both sides of the foot plate 181 (representing all further retaining rods 25 explained with reference to FIG. 1) is shown schematically. Likewise, the guiding of a connection pin 26 through a pinch 181*b* in the foot plate 181.

FIG. 11 schematically shows the disk-shaped diaphragm 51 of FIG. 1 in an enlarged view and in a plan view of a planar side. The diaphragm 51 has a diaphragm hole 51*a* and on the two sides two elastically resilient brackets 51*b*. These are integral components of the diaphragm 51. They are produced by an incision into the diaphragm material, which starting from the edge extends essentially peripherally along the edge over a circumferential angle of approximately 45 degrees. In the installed state, the spring legs 51*b* produced in this way rest on two upper contact points and on two lower contact points of the retainer 3, which are indicated in FIG. 11 by the reference numerals 51*d*.

The invention claimed is:

1. Gas discharge lamp, in particular deuterium lamp, having a gas-filled lamp bulb which surrounds an electrode insert, wherein the electrode insert comprises:

(a) a partition wall made of an electrically insulating material, (b) a cathode-side assembly mounted on a front side of the partition wall and comprising a cathode, a cathode window and a light emission window, (c) an anode-side assembly mounted on a rear side of the partition wall, comprising an anode and at least one diaphragm, which with the light emission window defines an optical axis along which a radiation generated by discharge is emitted from the light emission window, wherein at least the anode and the at least one diaphragm are combined to form a component ensemble, and wherein at least one retaining profile for retaining the component ensemble projects from the rear side of the partition wall.

2. Gas discharge lamp according to claim 1, wherein the component ensemble is designed as a component stack.

3. Gas discharge lamp according to claim 1, wherein the component ensemble comprises at least two diaphragms.

4. Gas discharge lamp according to claim 3, wherein at least one of the at least two diaphragms has a contact to an electrical connection pin.

5. Gas discharge lamp according to claim 2, wherein the component stack has a stack height and a stack circumference, wherein the at least one retaining profile at least partially encloses the stack circumference over the stack height.

6. Gas discharge lamp according to claim 2, wherein the component stack comprises a spring element which is designed to press the component stack against the partition wall.

7. Gas discharge lamp according to claim 2, wherein the component stack comprises insulating elements and at least one spacing compensation element.

8. Gas discharge lamp according to claim 1, wherein the at least one retaining profile comprises at least two tube-shell-shaped profile parts which are arranged around the optical axis with their open sides opposite one another.

9. Gas discharge lamp according to claim 1, wherein the at least one diaphragm has integral spring elements.

10. Gas discharge lamp according to claim 9, wherein the at least one diaphragm is designed as a diaphragm disk, and in that the integral spring elements are designed as flexible brackets created by peripheral disk-edge incisions on opposite sides of the diaphragm disk.

11. Gas discharge lamp according to claim 9, wherein the integral spring elements are supported on the at least one retaining profile.

12. Gas discharge lamp according to claim 1, wherein the partition wall and the at least one retaining profile are designed as one piece.

13. Gas discharge lamp according to claim 1, wherein a mounting plate is arranged on the rear side of the partition wall, said mounting plate being provided with through-holes through which electrical connections are guided to the anode-side assembly.

14. Gas discharge lamp according to claim 13, wherein retaining rods for mounting the electrode insert in the gas-filled lamp bulb engage in the mounting plate.

15. Gas discharge lamp according to claim 13, wherein the mounting plate is connected to a hollow mounting base which in an installed state extends in a direction of a lamp foot of the gas discharge lamp.

16. Gas discharge lamp according to claim 15, wherein the partition wall, the mounting plate and the hollow mounting base are designed as one piece.

17. Gas discharge lamp according to claim 2, wherein the anode-side assembly comprises an anode housing which surrounds the at least one retaining profile and a component stack retained thereon, and in that the cathode-side assembly comprises a cathode housing for receiving the cathode.

18. Gas discharge lamp according to claim 17, wherein the cathode housing is composed of a plurality of molded parts which are connected to one another by means of a plug-in connection, in particular an interlocking connection.

19. Gas discharge lamp according to claim 17, wherein the cathode housing has bendable insertion tabs which correspond to longitudinal slots in the partition wall.

20. Gas discharge lamp according to claim 1, wherein the partition wall consists of ceramic, in particular of aluminum oxide ceramic.

21. Gas discharge lamp according to claim 1, wherein it comprises a glass foot plate mounted in the gas-filled lamp bulb, on which a plurality of retaining rods and a plurality of electrical connection pins are mounted, wherein the glass foot plate, the plurality of retaining rods and the plurality of electrical connection pins form a prefabricated assembly which is electrically and mechanically connected to the electrode insert.

22. Gas discharge lamp according to claim 1, wherein the partition wall comprises the at least one retaining profile.

* * * * *